Patented Jan. 21, 1941

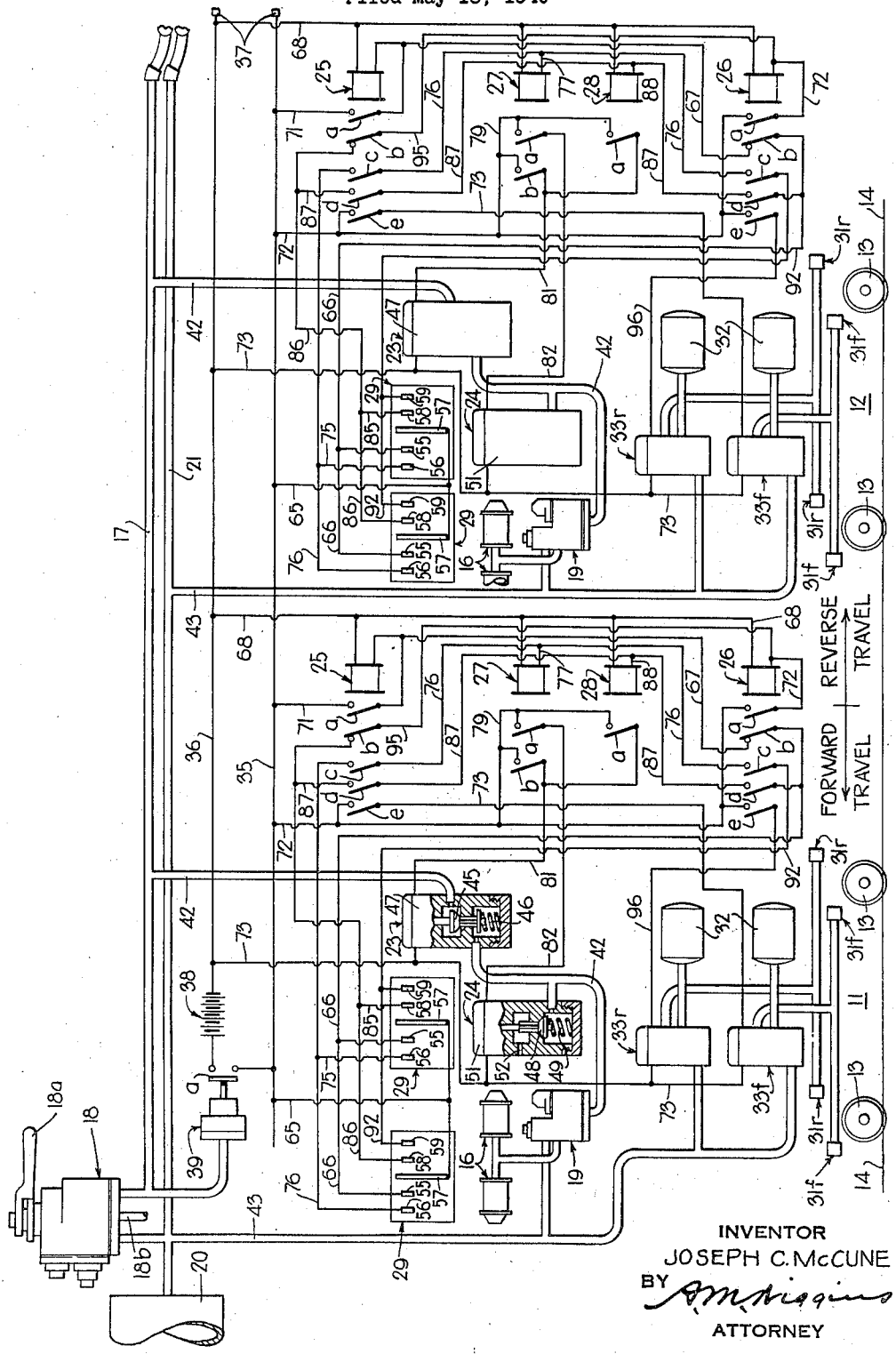

2,229,515

UNITED STATES PATENT OFFICE 2,229,515

BRAKE AND SANDING CONTROL APPARATUS

Joseph C. McCune, Edgewood, Pa., assignor to The Westinghouse Air Brake Company, Wilmerding, Pa., a corporation of Pennsylvania Application May 18, 1940, Serial No. 335,969

9 Claims. (Cl. 291—15)

This invention relates to brake and sanding control apparatus for vehicles, such as railway cars or trains, and has particular relation to apparatus automatically responsive to the rate of rotative deceleration of individual wheels or wheel units of the vehicle for so controlling the braking and sanding operation as to prevent sliding of the vehicle wheels.

It is well known that if the brakes associated with a vehicle wheel are applied with sufficient force to exceed the adhesion or rolling friction between the wheel and the road surface or rail, the wheel begins to slip, that is decelerate at a rapid rate toward a locked or non-rotative condition and slide. The terms "slip" and "slide" as applied herein are not synonymous for the reason that the term "slip" refers to the rotation of the vehicle wheel at a speed less than a speed corresponding to vehicle speed at a given instant whereas the term "slide" refers to the dragging of the vehicle wheel along a road surface or rail in a locked or non-rotative condition.

In view of the fact that the rotative deceleration of the vehicle wheel cannot exceed a certain rate such as four or five miles per hour per second without danger of slipping, it has been proposed to provide various types of devices responsive only to rotative deceleration of a vehicle wheel in excess of a rate such as ten miles per hour per second which cannot be obtained unless the wheel is slipping, for the purpose of recognizing the slipping condition of the wheel and instantly and rapidly reducing the degree of application of the brakes so as to cause the slipping wheel to cease decelerating and begin to accelerate back toward a speed corresponding to vehicle speed without actually reducing in speed to a locked or non-rotative condition. It will be understood that it is highly desirable to prevent sliding of the vehicle wheels, particularly the wheels of railway cars and trains, for the reason that the repair and replacement cost of car wheels necessitated by flat spots caused by sliding is avoided.

It is an object of my present invention to provide novel apparatus of the above character, including apparatus responsive to the rate of rotative deceleration of individual wheels or wheel units of a vehicle or car, for effecting a sanding operation when the wheels of the vehicle exceed a certain rate while the wheels are not slipping and for thereafter effecting a rapid release of the brakes associated with the wheels if they begin to slip.

It is another object of my invention to provide brake and sanding control apparatus of the type indicated in the foregoing object and further characterized by a novel arrangement for automatically causing sanding of the road surface or rails in advance of the vehicle wheels notwithstanding the travel of a car or train in opposite directions at different times.

The above objects and other objects of my invention will be made apparent hereinafter, are attained by means of an illustrative embodiment of my invention subsequently to be described and shown in the accompanying single figure of the drawing.

Description of equipment

The equipment shown in the single figure of the drawing is that for a single railway car having two four-wheel trucks 11 and 12 referred to hereinafter as the front wheel truck and rear wheel truck, respectively. It will be apparent that only one wheel 13 of each pair of axle-connected wheels is shown. The rail on which the wheels 13 roll is indicated by the line 14.

The brakes associated with the wheels 13 may be of the conventional friction shoe type adapted to be applied and released by variations of pressure in one or more brake cylinders 16. As shown there are two brake cylinders 16 for each truck but it will be understood that any desired number of cylinders may be provided. The pressure of the fluid supplied to the brake cylinder 16 determines the degree of application of the brake, the brakes being released when fluid under pressure is released from the brake cylinder.

The pressure of the fluid in the brake cylinders is controlled manually by the operator of the vehicle through the medium of suitable apparatus including a train pipe 17 referred to hereafter as the control pipe, a manually operative brake valve 18 of the self-lapping type for controlling the fluid pressure in the control pipe, and a pair of relay valve devices 19 of well-known construction, one for each wheel truck, controlled according to the pressure in the control pipe for controlling the pressure in the brake cylinders of the corresponding truck. The source of fluid under pressure for charging the control pipe 17 is a reservoir 20, hereinafter referred to as the main reservoir. A train pipe 21, hereinafter referred to as the supply pipe, is constantly connected to the main reservoir and serves to conduct fluid under pressure to the relay valve device 19.

The pressure in the brake cylinders 16 of each wheel truck is also controlled by apparatus automatically responsive to the rate of rotative deceleration and acceleration of individual wheel units on the corresponding truck. Such apparatus includes a cut-off magnet valve 23, a so-called vent or fast release magnet valve 24, a pair of relays 25 and 26 hereinafter respectively referred to as the forward and reverse directional relays, a relay 27 referred to hereinafter as the slip relay, a relay 28 hereinafter referred to as the lap relay, and individual mechanism or apparatus 29 for each wheel unit responsive to the rate of rotative deceleration or acceleration of the pair of wheels of the corresponding unit.

The sanding apparatus for each wheel truck may comprise a pair of sanding devices 31f and 31r. The sanding devices are of conventional construction and therefore need no description other than to point out that they operate to deposit sand in advance of the vehicle wheels for the forward direction of travel and the reverse direction of travel respectively upon the supply of fluid under pressure thereto.

A sanding reservoir 32 is provided for the pair of forward direction sanding devices 31f on each truck and a similar sanding reservoir 32 is provided for the pair of reverse direction sanding devices 31r on each truck. There is provided for each wheel truck a forward direction sanding magnet valve 33f and a reverse direction sanding magnet valve 33r. These sanding magnet valves are of well-known double beat type adapted to control the charging of the sanding reservoirs and the supply of fluid under pressure to the sanding devices from the sand reservoirs in the manner to be hereinafter more fully described.

The equipment further includes a pair of train wires 35 and 36 extending longitudinally from end to end of the car and respectively referred to hereinafter as the positive battery wire and the negative battery wire. Suitable connectors or couplers 37 are provided for connecting the sections of the train wires on successive cars. Associated with the train wires 35 and 36 is a suitable source of direct-current, such as the storage battery 38, which may be the conventional lighting battery on a car, and a pressure-operated switch 39 of conventional design controlled according to the pressure in the control pipe 17.

Considering the parts of the equipment in greater detail, the brake valve 18 is of the well-known self-lapping type having a rotary operating shaft adapted to be rotatively shifted by means of an operating handle 18a and functioning to cause operation of a suitable self-lapping valve mechanism. The operating handle 18a has a normal brake release position in which the self-lapping mechanism is effective to cause the exhaust of fluid under pressure from the control pipe 17 through an exhaust port 18b of the brake valve. As the brake valve handle 18a is shifted in a horizontal plane out of its brake release position into a so-called application zone, the self-lapping valve mechanism is operated to supply fluid under pressure from the main reservoir 20 to the control pipe 17, the pressure established in the control pipe being substantially proportional to the degree of displacement of the brake valve handle 18a out of its brake release position. The self-lapping valve mechanism of the brake valve operates to maintain a pressure in the control pipe 17 which corresponds to the degree of displacement of the brake valve handle out of its brake release position if for some reason the pressure in the control pipe tends to reduce. This pressure maintaining feature will be further referred to hereinafter.

It will be understood that any other mechanism which serves the same purpose as the brake valve 18 may be provided.

The relay valve devices 19 are of the well-known self-lapping type and need no specific description. Briefly, however, each relay valve 19 comprises an operating piston or diaphragm having a pressure chamber at one side thereof to which fluid under pressure is supplied through a branch pipe 42 of the control pipe 17. The self-lapping valve mechanism of the relay valve device 19 is operative in response to the pressure established in the pressure chamber to supply fluid under pressure from a branch pipe 43 of the supply pipe 21 to the brake cylinders 16 of the corresponding truck, the pressure established in the brake cylinders being substantially equal to that established in the pressure chamber of the relay valve. The relay valve devices 19 are of the super-sensitive high capacity type so as to effect a variation of the pressure in the brake cylinders 16 substantially in accordance with the variation of the pressure in the pressure chambers thereof.

The cut-off magnet valves 23 are of well-known construction and need no description. Briefly, however, each magnet valve 23 comprises a poppet valve 45 which is biased to an unseated position by a coil spring 46 and which is actuated to a seated position in response to energization of an electromagnet winding 47. When the valve 45 is unseated, communication is established through the branch pipe 42 from the control pipe 17 to the pressure chamber of the relay valve 19 of the corresponding truck. When the valve 45 is seated, this communication is closed.

The vent magnet valves 24 are also of well-known construction and should thus require no specific description. Briefly, however, each magnet valve 24 comprises a poppet valve 48 which is normally urged to a seated position by a coil spring 49 and which is actuated to an unseated position in response to energization of an electromagnet winding 51. When the valve 48 is unseated, an exhaust communication is established through which fluid under pressure is released from the pressure chamber of the corresponding relay valve device 19 to atmosphere through an exhaust port 52. The exhaust port 52 is of relatively large flow capacity and accordingly, when the valve 48 is unseated, a very rapid reduction of the fluid pressure in the pressure chamber of the corresponding relay valve 19 occurs.

The relays 25, 26, 27, and 28 are conventional relays of the neutral type, each having a suitable magnetic core (not shown) with which is associated an operating winding and an armature adapted to operate suitable switch or contact members.

The directional relays 25 and 26 are identical and each is provided with five contact members designated a, b, c, d, and e, respectively. All of the contact members are so-called front-contact members except the contact member b which is a back-contact member. It will be understood that the front-contact members are normally in open position when the winding of the relay is deenergized and are actuated to a closed position upon energization of the relay winding, whereas the back-contact member is in closed position when the winding of the relay is deenergized and is actuated to an open position when the winding of the relay is energized.

In a similar manner, the slip relay 27 is provided with two front-contact members, designated $a$ and $b$, respectively, and the lap relay 28 is provided with a single front-contact member $a$.

The deceleration and acceleration responsive devices 29 are shown diagrammatically in block form for the reason that they may be of either the mechanical or the electrical type.

The mechanical type of such apparatus may take the form shown in my prior Patent 2,132,959 and comprises a fly-wheel driven according to the speed of rotation of the associated vehicle wheel or wheel unit and adapted to shift forwardly and backwardly with respect to a neutral position in accordance with the rate of rotative deceleration or acceleration respectively of the wheel to effect the successive engagement of suitable switch or contact members.

The electrical type of such apparatus may take the form shown in the copending application of Claude M. Hines. For purposes of the present invention, it is immaterial whether the deceleration and acceleration devices 29 are of the mechanical or electrical type it being sufficient to explain merely that certain switch contacts are opened or closed depending upon the rate of rotative deceleration and acceleration of corresponding vehicle wheels or wheel units for a given direction of rotation of the wheels.

Each of the acceleration and deceleration devices 29 may therefore comprise two contact members 55 and 56 which are successively engaged by a common contact member 57 in response to deceleration, or acceleration of the corresponding vehicle wheel. In a similar manner each of the devices 29 comprises a pair of contact members 58 and 59 which are successively engaged by the contact member 57 in response to deceleration or acceleration of the corresponding vehicle wheel.

It will be understood that if the contact members 55 and 56 are engaged by contact member 57 in response to deceleration of the corresponding vehicle wheel then the contact members 58 and 59 are engaged by contact member 57 in response to acceleration of the same wheel. Conversely, if the contact members 58 and 59 are engaged successively by contact member 57 in response to deceleration of the corresponding vehicle wheel then contact members 55 and 56 are engaged successively by contact member 57 in response to acceleration of the same wheel. In other words, each set of contact fingers 55, 56 and 58, 59 are engaged by the contact member 57 during deceleration of the corresponding vehicle wheels for opposite directions of rotation thereof and in response to acceleration of the same vehicle wheels for opposite directions of rotation thereof.

The character and design of the devices 29 is such that the common contact member 57 engages the contact members 55 and 58 in response to rotative deceleration or acceleration of the corresponding vehicle wheels at a rate exceeding, for example, four miles per hour per second. On the other hand, the common contact member 57 does not engage the contact fingers 56 and 59 unless the vehicle wheels are decelerating or accelerating at a slipping rate in excess of a rate, such as ten miles per hour per second. In other words, the contact members 55 and 58 may be engaged by the contact member 57 while the corresponding vehicle wheels are not slipping but the contact members 56 and 59 are not engaged by the contact member 57 unless the corresponding vehicle wheels are slipping.

The pressure switch 39 may be of any suitable type, preferably snap-acting, having a contact member $a$ adapted to be shifted into and out of engagement with a pair of associated contact members in response to variations of the fluid pressure in the control pipe 17 above and below a certain low pressure, such as five pounds per square inch. For purposes of the present application, it is necessary to understand only that the contact member $a$ of the pressure switch 39 is snap-actuated to closed position engaging the associated pair of contact members when the pressure in the control pipe 17 exceeds a certain low pressure, such as five pounds per square inch, and is snap-actuated out of engagement with the associated pair of contact members when the pressure in the control pipe is reduced below five pounds per square inch.

As will be apparent from subsequent description, the pressure switch 39 controls the connection of the positive battery wire 35 to the positive terminal of the storage battery 38. Thus when the pressure switch 39 is opened in response to the complete release of the brakes, the positive battery wire 35 is deenergized and consequently all electrical circuits likewise deenergized.

*Operation of equipment*

Let it be assumed that the car or vehicle is traveling in a forward (left-hand) direction along the road under power at a constant speed with the brakes released, that is while the brake valve handle 18$a$ is in its brake release position and the control pipe 17 correspondingly at atmospheric pressure, the main reservoir 20 being charged and maintained charged at the normal pressure carried therein, such as one hundred pounds per square inch, by a fluid compressor, not shown. The pressure switch 39 is accordingly in open position so that the positive battery wire 35 and electrical circuits are consequently deenergized. With the sanding magnet valves 33$f$ and 33$r$ deenergized, the sanding reservoirs 32 are accordingly charged with fluid under pressure from the main reservoir 20 and supply pipe 21 through the branch pipes 43. With the vehicle traveling at a constant speed, the contact members of the acceleration and deceleration responsive devices 29 are correspondingly in the position in which they are shown.

If, now, the operator desires to effect an application of the brakes to bring the vehicle to a stop, he first shuts off the propulsion power and then operates the brake valve handle 18$a$ into the application zone thereof an amount corresponding to a desired degree of application of the brakes. The control pipe 17 is accordingly charged with fluid at a pressure corresponding to the degree of displacement of the brake valve handle 18$a$ out of its normal brake release position, for example, twenty-five pounds per square inch and fluid at such pressure flows through each branch pipe 42 to the relay valve devices 19 for each wheel truck 11 and 12. The relay valve devices 19 accordingly operate to supply fluid under pressure from the main reservoir 20 and supply pipe 21 through the branch pipes 43 to the corresponding brake cylinders 16, the pressure established in the brake cylinders 16 corresponding to that established in the control pipe 17, namely twenty-five pounds per square inch. The friction brakes associated with the vehicle wheels 13 are accordingly applied to a degree in accordance with the pressure established in the brake cylinders and the vehicle immediately begins to decelerate at a rate dependent upon the degree of application of the brakes.

Let it now be assumed that the rate of deceleration of the vehicle resulting from a degree of application of the brakes corresponding to twenty-five pounds per square inch fluid pressure in the brake cylinders does not exceed three miles per hour per second. In such case, therefore, the contact member 57 of each acceleration and deceleration device 29 does not engage the contact member 55 because the rate of deceleration of the wheels is less than the four mile per hour per second rate required to effect such engagement.

The brakes accordingly remain applied substantially at the degree corresponding to the pressure established in the control pipe until such pressure is varied by the operator.

If the operator shifts the brake valve handle 18a farther away from the brake release position, the fluid pressure in the control pipe 17 and that in the brake cylinders 16 is correspondingly increased. Similarly, if the operator shifts the brake valve handle 18a back toward its normal brake release position, the pressure in the control pipe 17 and that in the brake cylinders 16 is correspondingly decreased. It will be apparent that the relay valve devices 19 operate to exhaust fluid under pressure from the brake cylinders 16 through an exhaust port thereof to effect the necessary reduction of the pressure in the brake cylinders 16 in accordance with the reduction of the pressure in the operating chamber of the relay valve devices as supplied from the control pipe 17.

Let it now be assumed that the operator either initially or during an application of the brakes causes the pressure in the control pipe 17 to be increased to a value such as forty pounds per square inch. Obviously, due to the increased fluid pressure established in the brake cylinders 16 the vehicle decelerates at a higher rate which it will be assumed is slightly in excess of four miles per hour per second. In such case, therefore, the contact member 57 of each of the acceleration and deceleration responsive devices 29 engages the associated contact member 55.

The engagement of the contact member 57 with the contact member 55 of each acceleration and deceleration responsive device 29 on the front wheel truck 11 is effective to establish a circuit for energizing the winding of the forward directional relay 25 for the front wheel truck 11. At the same time the acceleration and deceleration responsive devices for the rear wheel truck 12 operates similarly to establish a circuit for energizing the winding of the forward directional relay 25 of the rear wheel truck. Since the circuits for the two trucks are similar, only the circuit for the front wheel truck 11 will be traced. This circuit extends from the positive terminal of the battery 38 through the closed contact member a of the pressure switch 39 to the positive battery wire 35, thence by way of a branch wire 65 to the contact members 57 of both acceleration and deceleration devices 29, in parallel through two branch circuits each of which includes the contact member 57 and the contact member 55 of the corresponding device 29 to a wire 66, thence by way of the wire 66, back-contact member b of the reverse directional relay 26, a wire 67, winding of the relay 25, a wire 68 and the negative battery wire 36 back to the negative terminal of the battery 38.

The front-contact member a of the forward directional relay 25 for each wheel truck 11 and 12 is effective when thus closed to establish a holding circuit for maintaining the winding of the corresponding relay 25 thereafter energized independently of the contact members 57 and 55 of the corresponding acceleration and deceleration responsive device 29 and subject only to the opening of the pressure switch 39. This holding circuit is substantially the same for the relays 25 of the two wheel trucks and consequently the circuit for only the relay 25 for the front wheel truck 11 will be traced. This holding circuit extends from the positive terminal of the battery 38 by way of the closed pressure switch 39, positive battery wire 35, a branch wire 71 including the front-contact member a of the forward directional relay 25, and thence by way of the wire 67 including the magnet winding of the relay 25, wire 68 and negative battery wire 36 back to the negative terminal of the battery 38.

The front-contact member e of each of the forward directional relays 25 is effective in its closed position to establish a circuit for energizing the magnet winding of the forward direction sanding magnet valves 33f and, because this circuit is substantially identical for the two wheel trucks, only that for the front wheel truck 11 will be traced. The circuit extends from the positive terminal of the battery 38 by way of the closed pressure switch 39 to the positive train wire 35, thence by way of a branch wire 72, a wire 73 including contact member e of the relay 25 and the magnet winding of the sanding magnet valve 33f, and the negative battery wire 36 back to the negative terminal of the battery 38.

The forward direction sanding magnet valves 33f for both trucks are thus simultaneously operated to close the charging communication of the corresponding sanding reservoirs 32 and establish a communication through which fluid under pressure is supplied from the sanding reservoirs 32 to the forward direction sanding devices 31f.

If it is desired to have a sanding operation continued for a limited time, the capacity of the sanding reservoirs 32 is correspondingly limited so that the pressure of the fluid therein will diminish sufficiently to cause termination of sanding within a certain time, such as ten or fifteen seconds. I prefer to cause the sanding operation to be limited to a certain length of time less than that required to bring the car or train to a stop so that, although the magnet windings of the sanding magnet valves remain energized, sanding will be terminated automatically without any act of the operator.

It will thus be seen that when the rotative deceleration of the vehicle wheels 13 exceeds the certain rate of four miles per hour per second beyond which the wheels are likely to slip, the sanding of the rails in advance of all the vehicle wheels is effected, thereby so improving the adhesion between the wheels and the rails as to diminish the possibility of the wheels beginning to slip.

If the rate of rotative deceleration of the car wheels is sufficiently in excess of the four mile per hour per second rate due to the degree of application of the brakes, one or more pairs of wheels may begin to slip notwithstanding the sanding of the rails. In such case a further operation of the equipment occurs which will now be described.

Let it be assumed that the trailing pair of wheels of the front wheel truck 11 begin to slip due to the application of the brakes thereon. In such case, the contact member 57 of the corresponding acceleration and deceleration responsive device 29 successively engages the contact members 55 and 56. If the rate of deceleration of the vehicle at the time slipping of the wheels begins is not sufficient to cause engagement of the contact member 57 with the contact member 55 of the acceleration and deceleration responsive device 29, then the engagement of the contact members 57 and 55 will operate to cause sanding of the rails in advance of the wheels of the front wheel truck in the manner just previously described.

The engagement of the contact members 57 and 56 of the device 29 for the trailing wheels of the front wheel truck is effective to cause energization of the magnet winding of the slip relay 27. This circuit extends from the positive terminal of the battery 38 by way of the closed pressure switch 39 to the positive battery wire 35, thence by way of the branch wire 65, contact members 57 and 56 of the device 29 for the trailing wheels of the front wheel truck 11, a wire 75, a wire 76 including the front-contact member c of the previously pick-up forward directional relay 25 for the front wheel truck, a branch wire 77 including the magnet winding of the slip relay 27, and wires 68 and 36 back to the negative terminal of the battery 38.

The contact members a and b of the slip relay 27 are thus both actuated to closed position to establish, respectively, a circuit for energizing the magnet winding 51 of the vent magnet valve 24 and a circuit for energizing the magnet winding 47 of the cut-off magnet valve 23.

The circuit for energizing the magnet winding 47 of the cut-off magnet valve 23 extends from the positive terminal of the battery 38 to the positive battery wire 35 by way of the closed pressure switch 39, thence by way of the branch wire 72, a wire 79, contact member b of slip relay 27, a wire 81 including the magnet winding 47 of the cut-off magnet valve 23, and wires 73 and 36 back to the negative terminal of the battery 38. Valve 45 of the cut-off magnet valve 23 is accordingly shifted to seated position and closes communication through the branch pipe 42 between the control pipe 17 and the pressure chamber of the relay valve device 19 for the front wheel truck 11.

The circuit for energizing the magnet winding 51 of the vent magnet valve 24 extends from the positive terminal of the battery 38 by way of the closed pressure switch 39, positive battery wire 35, branch wire 72, wire 79, contact member a of the slip relay 27, a wire 82 including the magnet winding 51 of the vent magnet valve 24, and wires 73 and 36 back to the negative terminal of the battery 38. The valve 48 of the vent magnet valve 34 is accordingly unseated and fluid under pressure is vented at a rapid rate from the pressure chamber of the relay valve device 19 of the front-wheel truck 11 to atmosphere through the exhaust port 52 of the vent magnet valve 24.

The relay valve device 19 accordingly operates in response to the rapid reduction of the pressure in its pressure chamber to effect a correspondingly rapid reduction of the pressure in the brake cylinders 16 for the front wheel truck through an exhaust port of the relay device.

Summarizing briefly, it will be seen that whenever any pair of wheels of a truck begins to slip, sanding is automatically initiated in advance of all wheels of the truck and the degree of application of the brakes of all wheels of the truck is automatically and instantly reduced at a rapid rate.

It should be observed that the sanding and brake release operation just described are confined to the particular wheel truck having the slipping wheels and that if the wheels on other trucks continue to rotate in a normal manner without slipping, no sanding or brake release on such truck occurs unless of course the rate of deceleration of the vehicle exceeds four miles per hour per second in which case sanding only is effected as previously described.

Due to the rapid reduction in the degree of application of the brakes on the truck having the slipping wheels, the slipping wheels promptly cease to decelerate and begin to accelerate back toward a speed corresponding to vehicle speed without decelerating to a locked or non-rotative condition and sliding. When the rate of deceleration of the slipping wheels reduces below a rate sufficient to maintain engagement of the contact members 57 and 56 of the acceleration and deceleration responsive device 29 for the slipping wheels of the front wheel truck, the circuit for energizing the magnet winding of the slip relay 27 is interrupted due to the separation of the contact members 57 and 56. The contact members a and b of the slip relay 27 are thus restored promptly to their open position to interrupt the circuits for energizing the magnet windings of the cut-off magnet valve 23 and the vent magnet valve 24.

Due to the acceleration of the slipping wheels back toward a speed corresponding to car speed at a rate at least exceeding ten miles per hour per second, the contact member 57 of the device 29 corresponding to the slipping wheels successively engages the contact members 58 and 59.

The engagement of the contact member 57 with the contact member 58 of the device 29 establishes a circuit for energizing the magnet winding of the lap relay 28. This circuit extends from the positive terminal of the battery 38 by way of the closed pressure switch 39, positive battery wire 35, branch wire 65, contact members 57 and 58, branch wire 85, a wire 86, a branch wire 87 including the front-contact member d of the forward directional relay 25 which is picked-up due to the holding circuit therefor previously described, a wire 88 including the winding of the lap relay 28, and wires 68 and 36 back to the negative terminal of the battery 38.

The contact member a of the lap relay 28 is accordingly actuated to closed position and establishes a circuit for energizing the magnet winding 47 of the cut-off magnet valve 23. This circuit needs no description inasmuch as the contact member a of the lap relay 28 is in parallel relation to the contact member b of the slip relay 27, the energizing circuit for the cut-off magnet valve 24 controlled by the contact member b of relay 27 having been previously described.

It is unlikely that the valve 45 of the cut-off magnet valve 23 will be unseated between the time that the circuit of the winding of the slip relay 27 is interrupted and the time that the circuit for energizing the winding of the lap relay 28 is established, due to the inherent operating lag of the magnet winding 47 of the magnet valve 23. However, if the valve 45 of the cut-off magnet valve 23 should be momentarily unseated during the fractional portion of a second that the slipping wheels are changing from deceleration to acceleration, the amount of fluid under pressure resupplied to the pressure chamber of the relay valve device 19 during such interval of time would be a negligible amount and reapplication of the brakes would, in any case, not occur at such time.

The engagement of the contact members 57 and 59 of the device 29 corresponding to the slipping wheels of the front wheel truck while the slipping wheels are accelerating back toward a speed corresponding to vehicle speed is without effect at this time for, as will be readily apparent, contact member 59 is connected by a wire to the contact member c of the reverse directional relay 26 and this contact member c is in open position because the relay 26 is not energized or picked-up.

The slipping wheels accelerate back toward a speed corresponding to vehicle speed at a rate at least equal to the maximum rate of deceleration at the beginning of the slipping period, especially so because of the deposition of sand on the rails being continued while the slipping wheels are accelerating back toward a speed corresponding to vehicle speed. Accordingly, the slipping wheels accelerate at a rate exceeding ten miles per hour per second and, as the slipping wheels approach a speed corresponding to vehicle speed, such rate of acceleration reduces rapidly. At the instant the slipping wheels attain a speed corresponding to vehicle speed, they begin to decelerate at the rate of deceleration of the vehicle.

It will be apparent, therefore, that the contact members 57 and 58 of the device 29 corresponding to the slipping wheels will remain in engagement until the slipping wheels are substantially restored to a speed corresponding to vehicle speed, at which time the rate of acceleration of the slipping wheels reduces below a rate corresponding to four miles per hour per second.

Separation of the contact members 57 and 58 of the device 29 for the slipping wheels of the front wheel truck accordingly occurs due to the reduction in the rate of acceleration of the wheels below four miles per hour per second. The separation of the contact members 57 and 58 of the device 29 corresponding to the slipping wheels of the front truck interrupts the circuit for energizing the winding of the lap relay 28 and the contact member a of the relay 28 is accordingly restored promptly to its open position.

If the vehicle is being decelerated at a rate less than four miles per hour per second, the consequent deceleration of the wheels which slipped will be insufficient to cause the engagement of the contact members 57 and 55 of the corresponding device 29 unless the wheels again begin to slip in response to the restoration of pressure in the brake cylinders resulting from the resupply of fluid under pressure from the control pipe 17 to the pressure chamber of the relay valve device 19 as a result of the opening of the cut-off magnet valve 23.

Accordingly, substantially at the time the slipping wheels attain a speed corresponding to vehicle speed again, the contact members 57 and 58 of the device 29 corresponding to the slipping wheels are separated and reengagement of the contact members 57 and 55 of the same device effected only if the rate of deceleration of the vehicle exceeds four miles per hour per second—otherwise not. If the rate of deceleration of the vehicle is less than four miles per hour per second, the restoration of the slipping wheels to a speed corresponding to vehicle speed and the consequent deceleration thereof in accordance with the rate of deceleration of the vehicle will be insufficient to cause engagement of the contact members 57 and 55 of the device 29. However, whether or not the contact members 57 and 55 are reengaged is immaterial for the reason that the directional relay 25 is maintained energized by the holding circuit previously described.

The deenergization of the magnet winding 47 of the cut-off magnet valve 23 as a result of the opening of the contact member a of the lap relay 28 causes reestablishment of the communication through the branch pipe 42 from the control pipe 17 to the pressure chamber of the relay valve device 19 of the front wheel truck 11 and fluid under pressure is again supplied to the pressure chamber in accordance with the pressure established in the control pipe 17. As previously indicated, the self-lapping brake valve 18 is adapted to maintain the pressure in the control pipe 17 at a pressure corresponding to the position of the brake valve handle 18a in the event that the pressure in the control pipe tends to reduce. Obviously, the reestablishment of the communication between the control pipe 17 and the pressure chamber of the relay valve device 19 necessarily produces or tends to produce a reduction of the pressure in the control pipe 17. However, due to the pressure maintaining feature of the brake valve 18, the pressure in the control pipe 17 is not reduced but maintained at a value corresponding to the position of the brake valve handle 18a.

The relay valve device 19 accordingly operates to re-supply fluid under pressure to the brake cylinders 16, the pressure established in the brake cylinders being that corresponding to the pressure established in the control pipe 17.

The total time elapsing from the instant the wheels begin to slip to the instant they are restored to a speed corresponding to vehicle speed is of the order of two or three seconds. Accordingly, since the sanding operation began at the instant slipping began, it will be apparent that the sanding operation continues for some few seconds after the slipping wheels are restored to a speed corresponding to vehicle speed. Thus if the time of sanding is limited to say ten or fifteen seconds, sanding will continue throughout the time that the wheels are slipping and thereafter for seven to twelve seconds. Due to the continued sanding of the rails and the consequent improvement in the adhesion of the wheels to the rails, it is therefore, unlikely that the wheels will again begin to slip. If, however, the assumed pair of wheels again begins to slip or if another pair of wheels should begin to slip, the above operation is repeated and at no time are any of the wheels permitted to decelerate to a locked or non-rotative condition and slide.

If any of the wheels on the rear wheel truck 12 begins to slip, the equipment for the rear wheel truck operates in a manner similar to that of the front wheel truck. A description of such operation for the rear wheel truck is accordingly deemed unnecessary.

The above operation has been described for the forward direction of travel of the car. If the car is connected in a train or if the car is individually driven so as to travel in a reverse direction, the equipment is automatically effective to cause sanding of the rails in advance of the wheels and a rapid release of the brakes in the same sequence as previously described. In order to describe the manner in which the sanding of the rails is effected in advance of the wheels for the reverse direction of travel automatically without necessitating any control operation by the operator, it is believed desirable to repeat a description of the operation for the reverse direction of travel of the car. Assuming, therefore, that the car is traveling in a reverse direction under power and that the operator desires to effect an application of the brakes, he may establish a pressure in the control pipe 17 corresponding to the desired degree of application of the brakes by means of a brake valve (not shown) similar to the brake valve 18 and located at the opposite end of the car or by means of a brake valve on another car (not shown) which is connected to the car shown.

Fluid under pressure is accordingly supplied through the branch pipes 42 to the pressure chamber of each of the relay valve devices 19 which corespondingly operate to supply fluid under pressure to the brake cylinders 16 in the manner previously described.

If the pressure established in the brake cylinders is such as to effect an application of the brakes to a degree to cause deceleration of the vehicle wheels uniformly without slipping, at a rate exceeding four miles per hour per second, the contact member 57 of the devices 29 for each wheel truck engage substantially simultaneously the corresponding contact member 58. It will be observed that in view of the reversed direction of travel, the engagement of the contact members 57 and 58 is effected in response to deceleration instead of in response to acceleration as previously.

The engagement of the contact members 57 and 58 of the devices 29 for each truck establishes a circut for energizing the winding of the reverse directional relay 26. Since the circuit for each wheel truck is substantially identical, the circuit for only the front wheel truck 11 will be described. This circuit extends from the positive terminal of the battery 38, by way of the closed pressure switch 39, positive battery wire 35, branch wire 65, in parallel through the contact members 57 and 58 of the two devices 29 to the wire 86, thence by way of the back contact member b of the forward directional relay 25, a wire 95, winding of the relay 26, and wires 68 and 36 back to the negative terminal of the battery 38.

It will be apparent that the contact members b of each of the relays 25 and 26 is an interlock contact member. This will be apparent from the fact that when the relay 25 is picked-up the contact member b thereof is actuated to open position to prevent energization of the winding of the relay 26 and when the relay 26 is picked-up the contact member b thereof is actuated to open position to prevent the energization of the winding of the relay 25.

The contact member a of relay 26 is effective in its closed position to establish a holding circuit for maintaining the winding of the relay 26 energized thereafter subject only to the opening of the pressure switch 39. This holding circuit extends from the positive terminal of the battery 38 by way of the closed pressure switch 39, positive battery wire 35, branch wire 72 including the contact member a of the relay 26, wire 95 including the winding of the relay 26, and wires 68 and 36 back to the negative terminal of the battery 38.

Contact member e of the reverse directional relay 26 is effective in its closed position to establish a circuit for energizing the magnet winding of the reverse direction sanding magnet valve 33r. This circuit extends from the positive terminal of the battery 38, by way of the closed pressure switch 39, positive battery wire 35, branch wire 72, contact member e of the relay 26, a wire 96 including the magnet winding of the reverse direction sanding magnet valve 33r, and wires 73 and 36 back to the negative terminal of the battery 38.

The reverse direction sanding magnet valve 33r on each truck is accordingly operated to close the charging communication to the corresponding sanding reservoir 32 and establish communication through which fluid under pressure is supplied from the sanding reservoirs to the sanding devices 31r. As indicated in the drawing, the sanding devices 31r are arranged to cause sanding of the rails in advance of the vehicle wheels for the reverse direction of travel.

Since the relay 26 is "stuck-up" by the holding circuit previously described, it will be apparent that sanding will continue for a limited time determined by the capacity of the sanding reservoirs 32 unless the pressure switch 39 is sooner opened in response to a substantially complete release of the brakes.

If while the vehicle is traveling in the reverse direction at a rate of deceleration less than four miles per hour per second, a pair of wheels on any of the trucks begins to slip, the cut-off and vent magnet valves 23 and 24 are operated in substantially the same manner as for the forward direction of travel due to the engagement of the contact members 57 and 59 of the device 29 corresponding to the slipping wheel. Obviously, the contact members 57 and 58 of a device 29 associated with the slipping wheels is effected before the engagement of the contact members 57 and 59 so that the sanding operation for the truck having the slipping wheels is initiated in the manner previously described.

Let it be assumed that the trailing wheels of the front wheel truck 11 for the reverse (right-hand) direction of travel begin to slip. In such case, sanding of the rails in advance of the wheels 13 of the wheel truck 11 (acting as a rear wheel truck) is automatically effected when the slipping wheels exceed a rate of deceleration corresponding to a rate of deceleration of the vehicle of four miles per hour per second. The subsequent engagement of the contact members 57 and 59 of the device 29 corresponding to the slipping wheels establishes a circuit for energizing the winding of the slip relay 27. This circuit extends from the positive terminal of the battery 38 by way of the closed pressure switch 39, positive battery wire 35, branch wire 65, contact members 57 and 59 of the device 29 corresponding to the slipping wheels, wire 92, contact member c of the reverse directional relay 26, wire 76, wire 77 including the winding of the slip relay 27, and wires 68 and 36 back to the negative terminal of the battery 38.

The contact members a and b of the slip relay 27 are accordingly actuated to closed position to respectively establish the circuits for energizing the magnet winding of the vent magnet valve 24 and the cut-off magnet valve 23 in the manner previously described.

The cut-off magnet valve is accordingly operated to close communication through the branch pipe 42 to the relay valve device 19 for the wheel truck 11 and the vent magnet valve 24 is operated to rapidly exhaust fluid under pressure from the pressure chamber of the said relay valve device 19 to atmosphere through the exhaust port 52. The relay valve device 19 correspondingly operates to rapidly reduce the pressure in the brake cylinders 16 for wheel truck 11.

Due to the instantaneous and rapid reduction of the pressure in the brake cylinders, the slipping wheels cease to decelerate and begin to accelerate back toward a speed corresponding to vehicle speed without actually decelerating to a locked or non-rotative condition and sliding.

When the rate of the deceleration of the slipping wheels reduces below a rate sufficient to maintain the engagement of the contact members 57 and 59 and these contact members thus separate, the circuit for energizing the winding of the slip relay 27 is interrupted and the contact members a and b of the relay 27 are promptly restored to open position. The windings of the cut-off and vent magnet valves 23 and 24 are thus deenergized.

The vent magnet valve 24 is accordingly restored to closed position to prevent further reduction of the pressure in the pressure chamber of the relay valve 19 which correspondingly operates to terminate further reduction of the pressure in the brake cylinders 16. The cut-off magnet valve 23 is not, however, restored to open position for, in the manner described for the forward direction of travel, the magnet winding 47 is promptly reenergized in the manner presently to be described.

When slipping wheels begin to accelerate at a rate exceeding four miles per hour per second, the contact member 57 engages the contact member 55 of the device 29 corresponding to the slipping wheels. This establishes a circuit for energizing the winding of the lap relay 28. This circuit extends from the positive terminal of the battery 38 by way of the closed pressure switch 39, positive battery wire 35, branch wire 65, contact members 57 and 55 of the device 29 corresponding to the slipping wheels, wire 66, contact member d of the reverse directional relay 26, wire 87, wire 88 including the winding of the relay 28, and wires 68 and 36 back to the negative terminal of the battery 38.

The contact member a of the lap relay 28 is correspondingly actuated to its closed position and, being in parallel with the contact member b of the slip relay 27, establishes the circuit for energizing the winding 47 of the cut-off magnet valve 23.

As previously described, the operating lag of the magnet winding of the cut-off magnet valve 23 is such as to prevent the momentary unseating of the valve 45 during the transitionary interval between deceleration and acceleration of the slipping wheels. Such interval is at most the fractional portion of a second.

The rate of acceleration of the slipping wheels back toward a speed corresponding to vehicle speed effects the engagement of the contact members 57 and 56 but such operation is without effect for the wire 76 connected to contact members 56 of the devices 29 is open at the contact member c of the relay 25.

Accordingly, as long as the slipping wheels accelerate at a rate exceeding four miles per hour per second, the lap relay 28 remains picked-up and, consequently, the cut-off magnet valve 23 remains closed preventing the resupply of fluid under pressure to the relay valve device 19.

When the slipping wheels are restored substantially to a speed corresponding to vehicle speed and the rate of acceleration thereof reduces below four miles per hour per second, the contact members 57 and 55 separate and interrupt the circuit for energizing the winding of lap relay 28. Contact member a of the lap relay 28 is thus promptly restored to its open position to cause deenergization of the magnet winding of the cut-off magnet valve 23. Valve 45 of the cut-off magnet valve 23 is correspondingly restored to its unseated position reopening communication through the branch pipe 42 between the control pipe 17 and the pressure chamber of the relay valve device 19.

The relay valve device 19 is accordingly operated, in accordance with the pressure established in the control pipe 17, to resupply fluid at a corresponding pressure to the brake cylinders 16 of wheel truck 11 to effect reapplication of the brakes on wheel truck 11.

It should thus be seen that the directional relays 25 and 26 are selectively picked-up depending upon the direction of rotation of the vehicle wheels and the consequent initial shift of the contact member 57 of the acceleration and deceleration responsive devices 29 in one or the other direction corresponding to the deceleration of the wheels for the direction of travel. The relays 25 and 26 thus automatically select which of the sanding magnet valves 33f or 33r will be operated. This manner of automatic selection of the sanding devices 31f or 31r to always effect sanding of the rails in advance of the vehicle wheels is a particular feature of my invention.

It will be apparent that when the vehicle comes to a stop in response to an application of the brakes, the contact member 57 of the devices 29 is always restored to a neutral position out of engagement with any of the associated contact members. Thus the cut-off and vent magnet valves 23 and 24 are automatically restored to their normal open and closed positions respectively. Accordingly, the operator may after the vehicle has come to a stop vary the pressure in the control pipe 17 to secure as high a pressure in the brake cylinders 16 as desired.

In view of the holding circuits established for either of the directional relays 25 or 26, the restoration of the contact member 57 of the devices 29 to its normal neutral position is ineffective to cause drop-out of the relays 25 and 26. This is accomplished by the opening of the pressure switch 39 in response to the reduction of the pressure in the control pipe 17 below five pounds per square inch when the brake valve handle 18a is shifted to its normal brake release position to effect release of the brakes prior to again starting the car. At the same time since the pressure switch 39 interrupts the connection from the positive terminal of the battery 38 to the positive battery wire 35 while the brakes are released, it will be apparent that the undesired engagement of any of the contact member 57 of any of the devices 29 and any of its associated contact members will be without effect. Consequently an undesired operation of the devices 29 due possibly to shock or jar of the vehicle during operation in service cannot effect the undesired operation of the magnet valves 23 and 24.

I have described my invention in connection with the equipment of a single vehicle or car but it will be understood that, in the case of a train of cars, each car is provided with similar equipment, the sections of the pipes 17 and 21 and of the train wires 35 and 36 on the several cars being suitably connected in the conventional manner and arranged for the control of the brakes on all of the cars by an operator stationed on one of the cars.

*Summary*

Summarizing, it will be seen that I have disclosed a brake and sanding control equipment for a single car or train of cars having devices responsive to the rate of acceleration and the rate of deceleration of individual wheels or wheel units for effecting an automatic control of sanding and an automatic control of the degree of application of brakes so as to prevent sliding of the wheels due to the application of the brakes under the control of the operator.

The equipment is of such nature that if the wheels of a car are uniformly decelerated in unison at a rate exceeding a certain rate such as four miles per hour per second without slipping, sanding is automatically initiated in advance of the wheels for either direction of travel of the car. The equipment is further effective if a wheel or wheel unit of any group, such as on a truck of a railway car, begins to slip while the vehicle is decelerating at a rate less than four miles per hour per second, to automatically effect in sequence the initiation of a sanding operation in advance of the wheels and a rapid reduction in the degree of application of the brakes associated with the wheels of that group or truck. The brakes on those trucks not having slipping wheels are not affected by slipping of wheels on another truck, being responsive only to the slipping of a wheel or wheel unit of those individual trucks.

The automatic selection of sanding devices to always effect the sanding of rails in advance of the vehicle wheels for either direction of travel of the car is effected by means of so-called directional relays which are interlocked and selectively picked-up depending upon the initial response of the acceleration and deceleration responsive devices to the deceleration of the wheels for the particular direction of travel of the car and the corresponding direction of rotation of the wheels.

The equipment is further so designed that the automatic reduction in the degree of application of the brakes effected as a result of the slipping of the wheels continues only so long as the rate of deceleration of the slipping wheels exceeds a certain rate, such as ten miles per hour per second. Furthermore, the reapplication of the brakes on the slipping wheels is prevented until the rate of acceleration thereof back toward a speed corresponding to vehicle speed diminishes below a certain low rate occurring substantially at the time the wheels return or are restored to a speed corresponding to car speed.

While I have disclosed only one embodiment of my invention, it will be apparent that various omissions, additions, or modifications may be made in the embodiment shown without departing from the spirit of my invention. It is accordingly not my intention to impose any limitations on the scope of my invention except in accordance with the terms of the appended claims.

Having now described my invention, what I claim as new and desire to secure by Letters Patent, is:

1. Sanding control apparatus for a wheeled vehicle comprising, in combination, a first sanding device operative to cause sanding in advance of a wheel of the vehicle when the vehicle travels in one direction, a second sanding device operative to cause sanding in advance of said wheel when the vehicle travels in the opposite direction, a first electroresponsive means effective when energized to cause operation of said first sanding device, a second electroresponsive means effective when energized to cause operation of said second sanding device, and means responsive to the rate of rotative deceleration of said wheel and selectively effective to cause energization of said first electroresponsive means or said second electroresponsive means whenever the rate of rotative deceleration of said vehicle wheel exceeds a certain rate depending upon the direction of rotation of said wheel.

2. Sanding control apparatus for a wheeled vehicle comprising, in combination, a first sanding device operative to cause sanding in advance of a wheel of the vehicle when the vehicle travels in one direction, a second sanding device operative to cause sanding in advance of said wheel when the vehicle travels in the opposite direction, a first electroresponsive means effective when energized to cause operation of said first sanding device, a second electroresponsive means effective when energized to cause operation of said second sanding device, means responsive to the rate of rotative deceleration of said wheel and selectively effective to cause energization of said first electroresponsive means or said second electroresponsive means whenever the rate of rotative deceleration of said vehicle wheel exceeds a certain rate depending upon the direction of rotation of said wheel, and means adapted to maintain either of said electroresponsive means energized independently of said deceleration responsive means once the electroresponsive means becomes energized.

3. Sanding control apparatus for a wheeled vehicle comprising, in combination, a first sanding device operative to cause sanding in advance of a vehicle wheel when the vehicle travels in one direction, a second sanding device operative to cause sanding in advance of said wheel when the vehicle travels in the opposite direction, a first sanding reservoir for said first sanding device, a second sanding reservoir for said second sanding device, a sanding magnet valve effective when deenergized to establish a communication through which fluid under pressure is supplied to cause charging of the said first sanding reservoir and operative upon energization to close the said charging communication for the first said sanding reservoir and establish a communication through which fluid under pressure is supplied from said first sanding reservoir to said first sanding device to cause sanding, a second sanding magnet valve effective while deenergized to establish a communication through which fluid under pressure is supplied to cause charging of the said second reservoir and operative upon energization to close the last said charging communication and establish a communication through which fluid under pressure is supplied from said second reservoir to said second sanding device to cause sanding, a first relay adapted when picked-up to cause energization of said first sanding magnet valve, a second relay effective when picked-up to cause energization of said second sanding magnet valve, and means responsive to the rate of rotative deceleration of said vehicle wheel adapted to selectively pick-up said first or said second relay whenever the rate of rotative deceleration of the vehicle wheel exceeds a certain rate depending upon the direction of rotation of the vehicle wheel.

4. Sanding control apparatus for a wheeled vehicle comprising, in combination, a first sanding device operative to cause sanding in advance of a vehicle wheel when the vehicle travels in one direction, a second sanding device operative to cause sanding in advance of said wheel when the vehicle travels in the opposite direction, a first sanding reservoir for said first sanding device, a second sanding reservoir for said second sanding device, a sanding magnet valve effective when deenergized to establish a communication through which fluid under pressure is supplied to cause charging of the said first sanding reservoir and operative upon energization to close the said charging communication for the said first sanding reservoir and establish a communication through which fluid under pressure is supplied from said first sanding reservoir to said first sanding device to cause sanding, a second sanding magnet valve effective while deenergized to establish a communication through which fluid under pressure is supplied to cause charging of the said second reservoir and operative upon energization to close the last said charging communication and establish a communication through which fluid under pressure is supplied from said second reservoir to said second sanding device to cause sanding, a first relay adapted when picked-up to cause energization of said first sanding magnet valve, a second relay effective when picked up to cause energization of said second sanding magnet valve, means responsive to the rate of rotative deceleration of said vehicle wheel adapted to selectively pick-up said first or said second relay whenever the rate of rotative deceleration of the vehicle wheel exceeds a certain rate depending upon the direction of rotation of the vehicle wheel, and means for maintaining either of said relays picked-up independently of the deceleration responsive means once the relay is picked-up.

5. Sanding control apparatus for a wheeled vehicle comprising, in combination, a first sanding device operative to cause sanding in advance of a vehicle wheel when the vehicle travels in one direction, a second sanding device operative to cause sanding in advance of the vehicle wheel when the vehicle travels in the opposite direction, a first sanding magnet valve operative upon energization to cause operation of said first sanding device, a second sanding magnet valve operative upon energization to cause operation of said second sanding device, a first relay effective when picked-up to cause energization of said first said sanding magnet valve, a second relay effective when picked-up to cause energization of said second sanding magnet valve, and means responsive to the rate of rotative deceleration of said vehicle wheel and selectively effective to cause pick-up of one or the other of said relays depending upon the direction of rotation of said vehicle wheel whenever the rate of rotative deceleration of the vehicle wheel exceeds a certain rate.

6. Sanding control apparatus for a wheeled vehicle comprising, in combination, a first sanding device operative to cause sanding in advance of a vehicle wheel when the vehicle travels in one direction, a second sanding device operative to cause sanding in advance of the vehicle wheel when the vehicle travels in the opposite direction, a first sanding magnet valve operative upon energization to cause operation of said first sanding device, a second sanding magnet valve operative upon energization to cause operation of said second sanding device, a first relay effective when picked-up to cause energization of said first said sanding magnet valve, a second relay effective when picked-up to cause energization of said second sanding magnet valve, means responsive to the rate of rotative deceleration of said vehicle wheel and selectively effective to cause pick-up of one or the other of said relays depending upon the direction of rotation of said vehicle wheel whenever the rate of rotative deceleration of the vehicle wheel exceeds a certain rate, and means adapted to maintain either of said relays picked-up independently of the deceleration responsive means once the relay is picked-up.

7. Vehicle brake and sanding control apparatus comprising, in combination, means under the control of the operator for effecting application and release of the brakes associated with a wheel of the vehicle, a first sanding device operative to cause sanding in advance of the said wheel when the vehicle travels in one direction, a second sanding device operative to cause sanding in advance of said wheel when the vehicle travels in the opposite direction, a first electroresponsive means effective when energized to cause operation of said first sanding device, a second electroresponsive means effective when energized to cause operation of said second sanding device, means responsive to the rate of rotative deceleration of the vehicle wheel due to application of the brakes for selectively energizing one or the other of said electroresponsive means depending upon the direction of rotation of the vehicle wheel in correspondence with the direction of travel of the vehicle whenever the rate of rotative deceleration of the vehicle wheel exceeds a certain rate, and means effective to maintain either of said electroresponsive means energized independently of the deceleration responsive means once the electroresponsive means becomes energized, and means effective upon substantial release of the brakes for rendering the last said means non-effective.

8. Vehicle brake and sanding control apparatus comprising, in combination, a first sanding device operative to cause sanding in advance of a wheel of the vehicle when the wheel rotates in one direction, a second sanding device operative to cause sanding in advance of the said wheel when the wheel rotates in the opposite direction, a sanding magnet valve operative upon energization to cause operation of the said first sanding device, a second sanding magnet valve operative upon energization to cause operation of said second sanding device, means providing a communication through which fluid under pressure is supplied to effect application of the brakes associated with said vehicle wheel, means under the control of the operator for supplying fluid under pressure through said communication at a pressure corresponding to a desired degree of application of the brakes, a cut-off magnet valve and a release magnet valve for respectively preventing the supply of fluid under pressure through said communication and releasing fluid under pressure from said communication to effect a release of the brakes independently of the operator controlled means, and means responsive to the rate of rotative deceleration and acceleration of said vehicle wheel for selectively causing energization of said one sanding magnet valve or said second sanding magnet valve depending upon the direction of rotation of the vehicle wheel whenever the rate of rotative deceleration of the vehicle wheel due to application of the brakes exceeds a certain rate, said deceleration and acceleration responsive means being further effective when the said vehicle wheel slips and exceeds a second certain rate of deceleration higher than the first said certain rate for effecting simultaneous operation of said cut-off magnet valve and said release magnet valve to effect a reduction in the degree of application of the brakes, operation of said release magnet valve to terminate further reduction in the degree of application of the brakes whenever the rate of rotative deceleration of the vehicle wheel reduces below said second certain rate and operation of said cut-off magnet valve to re-open said communication to permit the resupply of fluid under pressure therethrough to effect reapplication of the brakes only after the rate of acceleration of the slipping wheel back toward a speed corresponding to vehicle speed reduces below a rate corresponding in value to said certain rate of deceleration, means for maintaining either of said sanding magnet valves energized independently of said deceleration and acceleration responsive means once energization thereof is effected, and means effective in response to the release of the brakes under the control of the operator controlled means for rendering the last said means noneffective.

9. Brake and sanding control apparatus comprising, in combination, means under the control of the operator of the vehicle for effecting application and release of the brakes associated with the wheels of the vehicle, means responsive to the rate of change of speed of an individual wheel unit of the vehicle, means controlled by said rate-responsive means for controlling the degree of application of the brakes associated with the individual wheel unit independently of the operator controlled means, sanding means operative to effect sanding in advance of the wheel unit for one direction of rotation of the wheel unit and also sanding in advance of the wheel unit for the opposite direction of rotation thereof, and means selectively operable under the control of said rate-responsive means depending upon the direction of rotation of the said wheel unit for initiating operation of said sanding means to effect sanding only in advance of the wheel unit for the direction of rotation thereof whenever the rate of deceleration of the wheel unit exceeds a certain rate.

JOSEPH C. McCUNE.

CERTIFICATE OF CORRECTION.

Patent No. 2,229,515.  January 21, 1941.

JOSEPH C. McCUNE.

It is hereby certified that error appears in the printed specification of the above numbered patent requiring correction as follows: Page 3, first column, line 19, after "Hines" and before the period insert --, issued as Patent 2,208,738--; and that the said Letters Patent should be read with this correction therein that the same may conform to the record of the case in the Patent Office.

Signed and sealed this 22nd day of April, A. D. 1941.

(Seal)  Henry Van Arsdale,
Acting Commissioner of Patents.